June 4, 1968   M. B. WOOD   3,387,260
DYNAMIC DIRECTION INDICATOR FOR MOTOR VEHICLES
Filed Oct. 4, 1965

Inventor
Morris B. Wood
by Edward W. Fearing

United States Patent Office 3,387,260
Patented June 4, 1968

3,387,260
DYNAMIC DIRECTION INDICATOR FOR MOTOR VEHICLES
Morris B. Wood, Amesbury, Mass.
(P.O. Box 546, Ipswich, Mass. 01938)
Filed Oct. 4, 1965, Ser. No. 492,431
5 Claims. (Cl. 340—82)

ABSTRACT OF THE DISCLOSURE

A direction signal indicating system having a series of signal lamps on a vehicle arranged to be illuminated sequentially until all are lit, so as to provide a continuous dynamic indication repeatedly until the expected turn is made, the time interval of illumination for each lamp being effected through the inherent action of a single set of hot wire actuated relays.

---

Figure 1:
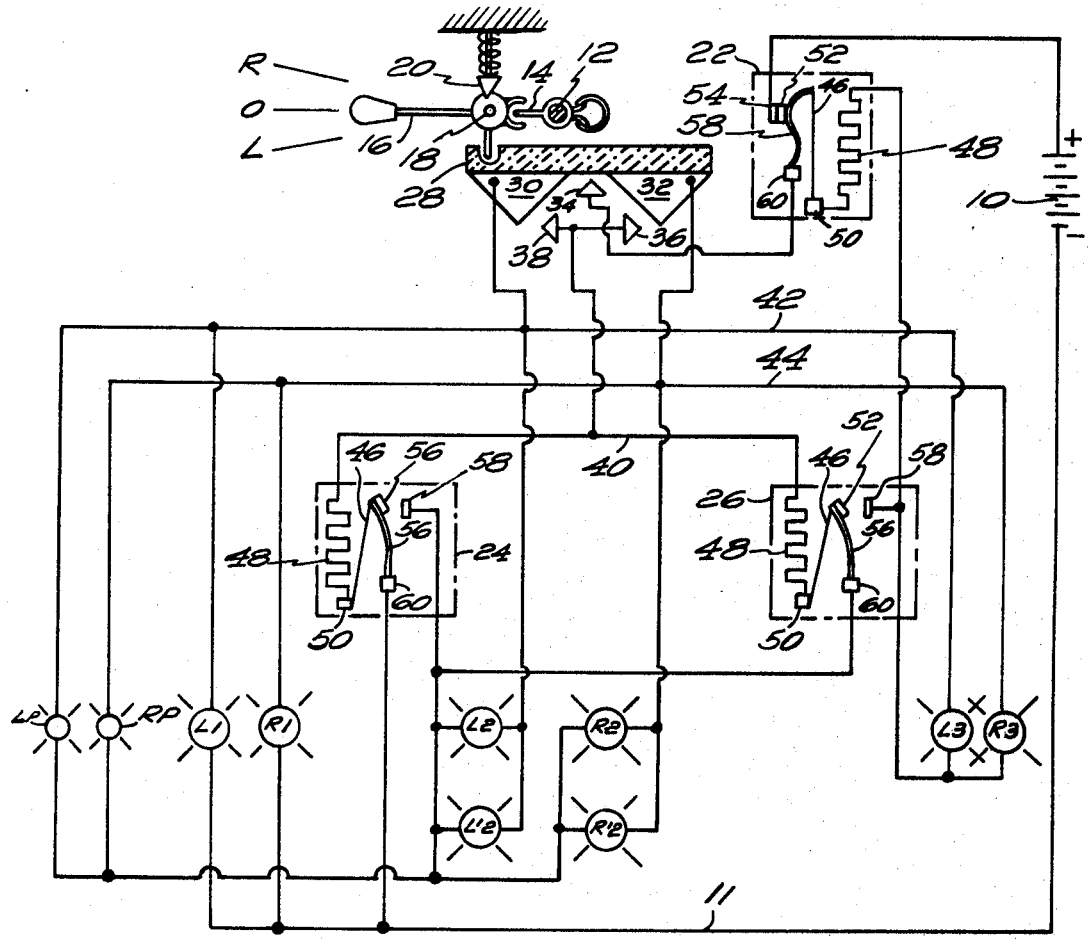

This invention relates to sequential direction signalling systems for use by one automotive vehicle to indicate to other vehicles the direction expected to be pursued by the first vehicle. More particularly the invention relates to improvements in a system having a series of signal lamps on a motor vehicle arranged to be illuminated sequentially until all are lit, so as to provide a continuous dynamic indication of direction to other vehicles.

The use of repeatedly flashing indicating lamps or a series of lamps illuminated sequentially until all are lit is not new. Wherever sequential operation is desired it is common to employ a continuously rotating drum with contacts connected by segments on the drum in the desired order. In order to utilize such drum it must be returned to a fixed starting position at the end of each signalling period. Otherwise, an easily mistaken indication is likely to be given when the signalling is restarted. This is because the drum may stop just before or while all of the lamps are lit. Then when the drum is restarted a flickering may occur as all the lamps are lit. Such flickering may result in an indication of wrong direction with danger of collision, the time required for direction determination being limited to a momentary glance by another vehicle driver. Thus, there is a problem of reliability in lighting the lamps in proper timed relation and thereafter of restoring the system to its starting condition at a sufficiently rapid rate to avoid a mistaken indication upon restarting.

To rotate a contact drum for sequential direction lights a suitable circuit for a driving motor must be provided, increasing the expense and the unreliability of the system. If an attempt is made to control the sequence cycle by ordinary magnetic relays having time delay devices built into them the expense and complication has heretofore been prohibitive for the advantage gained. Furthermore, the use of bimetallic strip operated devices for controlling the sequence cycle of such system necessitates operating current intensities all out of proportion to those required for illuminating signal lights and such bimetallic strip devices are too sluggish to provide the proper dynamic indication for glance determination of direction.

The primary object of the present invention is to eliminate the use of a rotating contact drum with its driving motor and control circuits and to accomplish the essential sequential dynamic signal indication entirely by inexpensive relays having inherent timing devices capable of closing and opening circuits to a series of lights in such a way that it is possible to determine by a very brief glance the intended direction of the vehicle regardless of the part of the sequence observed.

To these ends a feature of the present invention comprises the use in a dynamic direction indicating system for motor vehicles, having a series of electrically operated direction indicator lamps and means for lighting the lamps in repeated sequential cycles, comprising a set of hot wire actuated relays energized by current flow from one relay to another, the hot wires of the relays providing equal inherent time delay intervals upon being heated but with ability for rapid cooling by radiation when the flow of current is cut off, the current in each hot wire not being affected by the current in the contact actuated by that hot wire. By the use of hot wire relays it has been found that the accuracy of time interval obtainable far exceeds that of practically any other simple, nonprecision circuit controller and at an insignificant cost, especially where the time interval desired is the same for each and in the order of substantially less than a second. This accuracy is in part possible because of the relatively high temperature obtainable in a hot wire with low current consumption and because all of the relays can be factory adjusted with a single adjustment for all installations.

Figure 2:
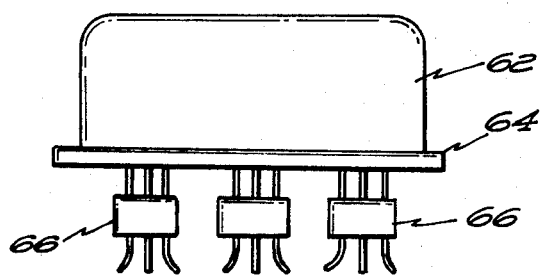

This and other features of the invention, as hereinafter described and claimed will readily be apparent to those skilled in the art from the following detailed specification taken in connection with the accompanying drawings, in which:

FIG. 1 is a wiring diagram of a system of dynamic sequentially signalling between automotive vehicles embodying the features of the present invention; and FIG. 2 is a view in elevation of a housing for a set of hot wire relays employed in the system of FIG. 1.

The illustrated signalling system is intended to produce continuous dynamic direction indication for a motor vehicle and is capable of quickly restoring the system to an initial starting condition as soon as the system is rendered inoperative during completion of a turn by the motor vehicle or by hand. The system is characterized by its simplicity, not requiring a rotating contact drum or its essential driving motor with controlling circuits for restoring the drum to its initial starting position. Neither is there required any complicated or more expensive differently timed relays or relatively large capacity condensers and resistors for providing graded time delays for the individual signals in the sequence.

The operation of the present system is dependent upon the use of relays actuated by self heated hot wires, both left and right hand signal indicators being provided by the same series of relays, all having the same adjustments for operation at equal time intervals. Preferably, each relay is energized by a connection including contact of a control switch or of another relay to avoid passage of any but a constant energizing current through its own hot wire. It has been found that such hot wire relays are not only particularly well adapted for time delays of short duration for a dynamic turn signalling system but that such relays are easily manufactured on a mass production basis, such as required by the automotive industry without departure from close standards of tolerances in equal characteristic time intervals. Without such close standards of equal time intervals it is necessary to provide three types of relays, each having individual adjustments and to determine carefully these time periods for all relays before assembly in each system. Otherwise, an assembled system with separately adjustable relays is more subject to likelihood of frequent departure from the standard as a result of vibration encountered in all automotive equipment than with a single nonadjustable type of relay. Furthermore, the construction of hot wire relays lends itself to easy elimination of vibratory effects and enables a compact unitary mounting of all relays in the system within a single housing.

Referring more particularly to the drawings, FIG. 1 shows a double series of three sequential front and rear indicator lamps L1, . . . L3 and R1 . . . R3. The front indicator lamps are distinguished from the rear indicator lamps by the use of prime letters, the rear lamps being the more important of the series, so that these only are used for dynamic sequential indicators. However, with the system illustrated the front lamps as well as the rear lamps may readily be converted to sequential operation. To determine operativeness in the system the instrument panel of the motor vehicle is equipped with a pair of pilot lamps LP and RP.

In order to obtain the most effective results in a dynamic signalling system the interval of time between illumination of one lamp in series and another should be substantially less than one second and each lamp of a series should remain lit until the last of the series also is lighted and the interval of time between extinguishment of all lamps and the renewed lighting of the first lamp of the series should be equal to the time elapsed between successive lighting of the other lamps. By limiting these time delay periods to a small fraction of a second the operator of a trailing motor vehicle may be able to determine from a very brief glance the intended direction to be taken and also is able to distinguish between the direction indication and a stop or other signal, the direction indication being given by more than one lamp in a specific sequence. While only three indicating lamps in each series are illustrated in FIG. 1 it is possible to have four or more for easier identification of direction, especially in connection parking and stop lamps.

To energize the lamps in the system a source of electrical current supply in the form of a battery 10 is employed. A negative terminal of the source is connected to the bases of the first by a common negative ground wire 11 of each series, in accordance with accepted automotive practice but intermediate and final indicator lamps do not have their bases connected to the negative ground in the system illustrated. However, this objection may be overcome by utilizing an extra pair of double throw switches connected for operation to a turn indicator lever ordinarily used to initiate the signalling.

To initiate operation of the system and to render it inoperative after a turn has been negotiated a main shaft in a steering mechanism is shown at 12, having surrounding it in frictional engagement a hub of an arm 14 extending between a pair of lugs on a hand actuated lever 16. The hand lever is fulcrumed at 18 on a steering column surrounding the shaft 12. The hub of the lever 16 is notched to releasably receive a spring pressed detent 20 whenever the arm is returned to its neutral position O. The lever 16 is raised to an R position for illumination of the right hand dynamic series of lamps R1, R2, R3 and is lowered to an L position for illumination of the left hand series of lamps L1, L2, L3. The pilot lamp LP or RP also is correspondingly lighted simultaneously with the lighting of the second turn indicator lamps L2 and R2. The pilot lamps LP and RP remain lighted throughout the time in which the lamps L2 and L3 of R2 and R3 are lighted and is extinguished at the end of each operating cycle in which all of the other lamps also are extinguished. In this way a double check is obtained on the condition of the system, particularly in the operation of the relays.

To terminate each cycle of operation for the signalling system, to restore it to a starting condition at any stage, or to extinguish all of the lamps for a brief interval of time equal to that between the lighting of successive lamps for repeated cycles of operation, according to the invention, the positve terminal of the battery 10 is connected to the hot wire of a hot wire circuit opener 22, the contacts for which provide the only possible path of current through a pair of hot wire relays 24 and 26 but do not affect the current through the hot wire of the circuit opener itself. So long as the contacts of the circuit opener 22 are closed, therefore, the relays 24 and 26 may be operated to give repeated sequential signals of a dynamic nature. The circuit opener 22 is actuated to disconnect the entire system from the source of supply for whichever series of lamps L or R is lighted and also to disconnect the hot wire of the relays 24 and 26 from the source of supply.

For connecting the desired series of lamps for a left or right hand turn signal the manually actuated lever 16 has a downwardly extending arm engaging a notch in a slide bar 28 of insulating material carrying a pair of separate movable contacts 30 and 32. The contacts 30 and 32 are arranged to engage selectively with three stationary contacts 34, 36 and 38, the contcts 36 and 38 being connected together. The contact 34 is connected to the circuit opener 22 and contacts 36 and 38 are connected to a common positive relay wire 40. The movable contact 30, in turn, is connected to a left hand signal wire 42 and the movable contact 32 is connected to a right hand signal wire 44.

When the manually actuated lever 16 is moved to the L position the left hand signal lamps are successively connected from the circuit opener to the relay wire 40 and the relays 24 and 26 are successively rendered operative. However, the circuit to the relay 26 is not completed immediately because there is no connection to it from the negative ground wire 11, the negative ground wire being connected to the relay 26 in the proper sequence by the contacts of the relay 24. Turn signal lamp L1, however, and the left pilot lamp LP are thus lit while the current from the source begins to heat up the relay 24. As soon as the contacts of the relay 24 are closed the second signal lamp L2 of the series is lit along with a corresponding front signal lamp L'2 and the hot wire of the final relay 26 of the set is connected to the negative ground wire 11 through the contacts of the relay 24. After the interval of time taken to close the contacts of the final relay 26 the final lamp L3 of the series is lit, completing the cycle. All of the other lamps for a left hand turn indication also remain lighted until L3 is lit.

The time interval in which all the left hand turn lamps remain lighted is determined by the action of the circuit opener 22, which is arranged to be connected to the negative ground wire 11 by the final relay 26 of the series to be energized at the same time that the final lamp L3 is lighted. This time interval is determined by the heating and expansion of the hot wire in the circuit opener 22, which is designed to provide substantially the same time interval as that for the relay 24 and 26. When the circuit opener 22 is rendered operative all of the signal lamps are deenergized and the contacts of relays 24 and 26 are opened to cut off all the relays from the source of supply. If the intended turn is negotiated the slide bar 28 is returned to its neutral position, the manually actuated lever 16 being returned to its O or off position by frictional movement with the steering shaft 12. If the turn is not negotiated by this time the signal lamps remain unlighted for the period of time required to cool the hot wire of the circuit opener 22. As soon as sufficient cooling occurs the contacts of the circuit opener are again closed and the initial lamp L1 is again lighted, repeating the cycle of operation outlined above.

A corresponding sequential operation of the signal lamps R1, R2, R3 is performed whenever the lever 16 is moved to the R or right signal position.

Both the relays 24 and 26 and the circuit opener 22 are of similar construction with their hot wires, indicated at 46, composed of high nickel alloy with relatively small current carrying capacity. In series with each hot wire is a ballast resistor 48 intended to protect the hot wire from sudden surges of possibility or destructive temperatures. The hot wires 46 are connected through the ballast resistors 48 between the common relay wire 40 and a movable contact of the respective relay. For this purpose each hot wire is attached to a fixed insulating post 50, to which the ballast resistor is also secured on the relay or circuit opener.

To prevent the current flowing through the contacts of a relay or of the circuit opener from affecting the current flowing in its hot wire, in this feature of the invention, the hot wire of each relay 24 and 26 is energized by an independent heating circuit, including the common relay wire 40 and connections to the negative ground wire 11. In the case of the circuit opener the independent heating circuit for the hot wire runs from the positive side of the supply source, through contacts 52 and 54 of the circuit opener at one side of the hot wire and the contacts of both relays 24 and 26 in series.

In the construction of the relays and the circuit opener affording an independent circuit each post 50 is made fast to the insulating frame or panel of the respective unit and the hot wire is stretched between the post and the upper end of a leaf spring 56 in the relays or a deformed leaf spring 58 in the circuit opener. The upper end of the spring 56 or 58 is bowed by contraction of each hot wire 46 while being cooled, the hot wires running nearly parallel to the general line of the bowed spring in order to impart maximum motion to the springs.

The spring 56 or 58 is secured at its lower end to a block 60 mounted in the frame of each unit. Above the block 60 the spring has secured to it the movable contact 52. The movable contact 52 of each unit is arranged to engage the stationary contact 54, also made fast to the insulating frame or base of that particular unit.

The principal difference between the relays 24, 26 and the circuit opener 22 is that in the relays the tension in the hot wire holds the contacts separated, whereas the circuit opener contacts are held closed by contraction of the hot wire. In the circuit opener the spring 58 also is constructed for snap action to prevent excessive arcing in opening the current supplied to all of the lamps. The snap action is accomplished by utilizing a spring formed before assembly of the circuit opener with a permanently deformed S-shape or a substantial dimple in its lower portion, such that while tension remains in the hot wire of the circuit opener the dimple or curvature at the lower end will cause deflection of the part of the spring carrying the contact toward the fixed contact, thus retaining the contacts in engagement. As soon as the hot wire of the circuit opener expands the curvature or dimple at the lower portion of the spring 58 is caused to reverse its deformation and to open the contacts with a quick movement. Also, it is desirable to emphasize the snap action of the circuit opener spring 54 by moving the lower end of the hot wire very close to the lower end of the spring.

The relays 24, 26 and the circuit opener 22 are extremely simple in construction and effective in operation for the purposes intended and the lengths and diameters of hot wires employed are substantially the same and have the same time interval of expansion and contraction. The current required for operating these units is extremely small in comparison to that required to operate the signal lamps and because of the diameter hot wire employed it is feasible to heat the wire to a temperature of several hundred degrees in a small fraction of a second. The wire because of its small diameter also cools rapidly more by a process of radiation when cut off from its source of supply than by convection, so that excessive heating of the units is avoided even though the units are enclosed in an unventilated space. For this reason it is possible to protect all of the units in a single housing 62 (see FIG. 2) and to mount all of the units on a single insulating base 64 with suitable openings for gang jacks. In this way multiple terminal plugs 66 may be inserted in the jacks on the bases 62 for assisting convenient assembly of the system with harness wiring.

Not only is a dynamic sequence direction indicator system as above described, simpler and less expensive to manufacture than any prior system employing a motor driven contact drum but because of the few moving parts required in the present system it retains its accuracy for sequential time intervals indefinitely and generally it can be said that a system employing such hot wire units for timing is capable of continued performance far beyond the natural life of any vehicle to which it is applied. Furthermore, the hot wire units, because of their simplicity of construction are readily adaptable to incorporation into systems utilizing brake signals which override by conventional circuitry the turn signals.

The nature and scope of the invention having been indicated and a particular embodiment having been described, what is claimed is:

1. A dynamic direction indicating system for motor vehicles, having a series of electrically operated direction indicator lamps and a source of electrical current for energizing the lamps, in combination with means for connecting the current source to the indicator lamps sequentially comprising a single set of hot wire actuated relays energized by current flow from one relay to another, the hot wire of each relay providing an inherent time delay interval upon being heated, the intervals of all the relays being equal and the wires being capable of rapid cooling by radiation when cut off from their source of supply.

2. A dynamic direction indicating system for motor vehicles, as in claim 1, in which there is provided a hot wire circuit opener having its hot wire connected to the source of current supply by the final relay of the set after being energized to deenergize all of the indicator lamps and relays.

3. A dynamic direction indicator system for motor vehicles, as in claim 2, in which there are provided two series of sequentially actuated indicator lamps, one for a left turn and one for a right turn and a manually actuated switch for selecting either series, operation of which is controlled by the same set of relays.

4. A dynamic direction indicator system for motor vehicles, as in claim 2, in which the circuit opener comprises a hot wire actuator and a permanently deformed spring capable of causing a snap action in opening the circuit for the hot wire relays.

5. A dynamic direction indicator system for motor vehicles, as in claim 3, in which the deformed portion of the circuit opener spring is reversed to cause the snap action and the circuit opener hot wire provides substantially the same time interval as those produced by the relay hot wires.

References Cited

UNITED STATES PATENTS 3,225,343  12/1965  Kratochvil _____ 340—331

JOHN W. CALDWELL, *Primary Examiner.*

A. H. WARING, *Assistant Examiner.*